United States Patent
Ogura

(10) Patent No.: US 7,640,147 B2
(45) Date of Patent: Dec. 29, 2009

(54) IMAGE FORMING DEVICE SIMULATION APPARATUS AND IMAGE FORMING DEVICE SIMULATION METHOD

(75) Inventor: Keiko Ogura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 553 days.

(21) Appl. No.: 11/476,115

(22) Filed: Jun. 28, 2006

(65) Prior Publication Data

US 2007/0225957 A1 Sep. 27, 2007

(30) Foreign Application Priority Data

Feb. 13, 2006 (JP) .............................. 2006-034959

(51) Int. Cl.
*G06F 17/50* (2006.01)
(52) U.S. Cl. .............................................. 703/7; 703/6
(58) Field of Classification Search ................ 703/6, 703/13, 7
See application file for complete search history.

(56) References Cited

U.S. PATENT DOCUMENTS

| | | | |
|---|---|---|---|
| 5,802,341 A | 9/1998 | Kline et al. | |
| 6,181,435 B1 | 1/2001 | Onodera | |
| 6,449,058 B1 | 9/2002 | Ueda | |
| 6,462,833 B1 | 10/2002 | Claiborne | |
| 6,486,968 B2 * | 11/2002 | Nishikawa | ................. 358/1.15 |
| 6,538,764 B2 | 3/2003 | Ueda | |
| 6,664,902 B2 | 12/2003 | Andrew et al. | |
| 6,701,420 B1 | 3/2004 | Hamilton et al. | |
| 6,717,693 B2 * | 4/2004 | Mitsuhashi et al. | ......... 358/1.15 |
| 6,914,696 B1 | 7/2005 | Kojima et al. | |
| 7,271,926 B2 | 9/2007 | Amemiya | |
| 7,298,380 B2 | 11/2007 | Yoshida | |
| 2002/0171868 A1 | 11/2002 | Yoshimura et al. | |
| 2004/0136020 A1 * | 7/2004 | Kumada | ..................... 358/1.9 |
| 2004/0236897 A1 | 11/2004 | Cheng | |
| 2005/0210463 A1 * | 9/2005 | Abe | ........................... 717/174 |
| 2007/0188486 A1 | 8/2007 | Honmi | |

FOREIGN PATENT DOCUMENTS

| | | | |
|---|---|---|---|
| JP | 9319784 A | * | 5/1996 |
| JP | 409319784 A | * | 5/1996 |
| JP | 8-331287 A | | 12/1996 |
| JP | 11-024546 A | | 1/1999 |
| JP | 2001-113803 A | | 4/2001 |
| JP | 2002-123383 A | | 4/2002 |
| WO | 2004/088989 A1 | | 10/2004 |

OTHER PUBLICATIONS

Korean Office Action dated Dec. 12, 2007.
Chinese Office Action dated Aug. 22, 2008.

* cited by examiner

*Primary Examiner*—Paul L Rodriguez
*Assistant Examiner*—Eunhee Kim
(74) *Attorney, Agent, or Firm*—Sughrue Mion, PLLC

(57) ABSTRACT

An image forming device simulation apparatus includes: an image formation command acquisition unit that acquires an image formation command including information about a target image targeted for formation by the image forming device; a simulation unit that performs a simulation of image formation processing in which the image forming device forms the target image on a record medium based on the image formation command; and a predicted time calculation unit that calculates and outputs predicted time for taking the image forming device to perform the image formation processing based on processing time taken to perform the simulation.

15 Claims, 6 Drawing Sheets

SIMULATION RESULT DISPLAY SCREEN

IMAGE FORMING DEVICE SIMULATION APPARATUS AND IMAGE FORMING DEVICE SIMULATION METHOD

CROSS-REFERENCE TO RELATED APPLICATION

This application claims priority under 35 USC 119 from Japanese Patent Application No. 2006-034959 filed on Feb. 13, 2006, the disclosure of which is incorporated by reference herein.

FIELD

The present invention relates to an image forming device simulation apparatus for performing a simulation of processing performed by an image forming device, an image forming device simulation method and a program.

BACKGROUND

At present, various models of an image forming device such as a printer or a copying machine are commercially available. By a kind of an image forming device, its operability varies, so that a user needs to master an operation according to a kind of an image forming device used by the user. Therefore, there is an art of simulating an action at the time of occurrence of trouble in an image forming device in order for a user to master an operation (see JP-A-8-331287)

However, the art of the conventional example described above is the art of simulating the handling at the time of occurrence of trouble using the image forming device actually, and an action of the image forming device at the time of actual use of a user cannot be simulated in a state in which there is no image forming device.

Particularly, as described below, a request to simulate performance of an image forming device at the time of actual use of a user is made. That is, in the case of buying an image forming device, a user normally makes a selection by, for example, comparing plural image forming devices with respect to performance of speed etc. of image formation by the image forming device by examining information released by catalogues etc. previously. However, the information released by catalogues etc. shows performance etc. of the case of being used under a certain condition generally and, for example, when a user frequently outputs image data of a particular format, the performance does not necessarily match with performance in the case of being actually used by a user. As a result of that, the user cannot know performance which the image forming device offers in a use form of the actual user until the image forming device is bought and used.

SUMMARY

The present invention provides an image forming device simulation apparatus capable of simulating performance of an image forming device at the time of actual use of a user, an image forming device simulation method and a program.

An image forming device simulation apparatus includes: an image formation command acquisition unit that acquires an image formation command including information about a target image targeted for formation by the image forming device; a simulation unit that performs a simulation of image formation processing in which the image forming device forms the target image on a record medium based on the image formation command; and a predicted time calculation unit that calculates and outputs predicted time for taking the image forming device to perform the image formation processing based on processing time taken to perform the simulation.

DETAILED DESCRIPTION

An embodiment will be described below with reference to the drawings.

Figure 1:
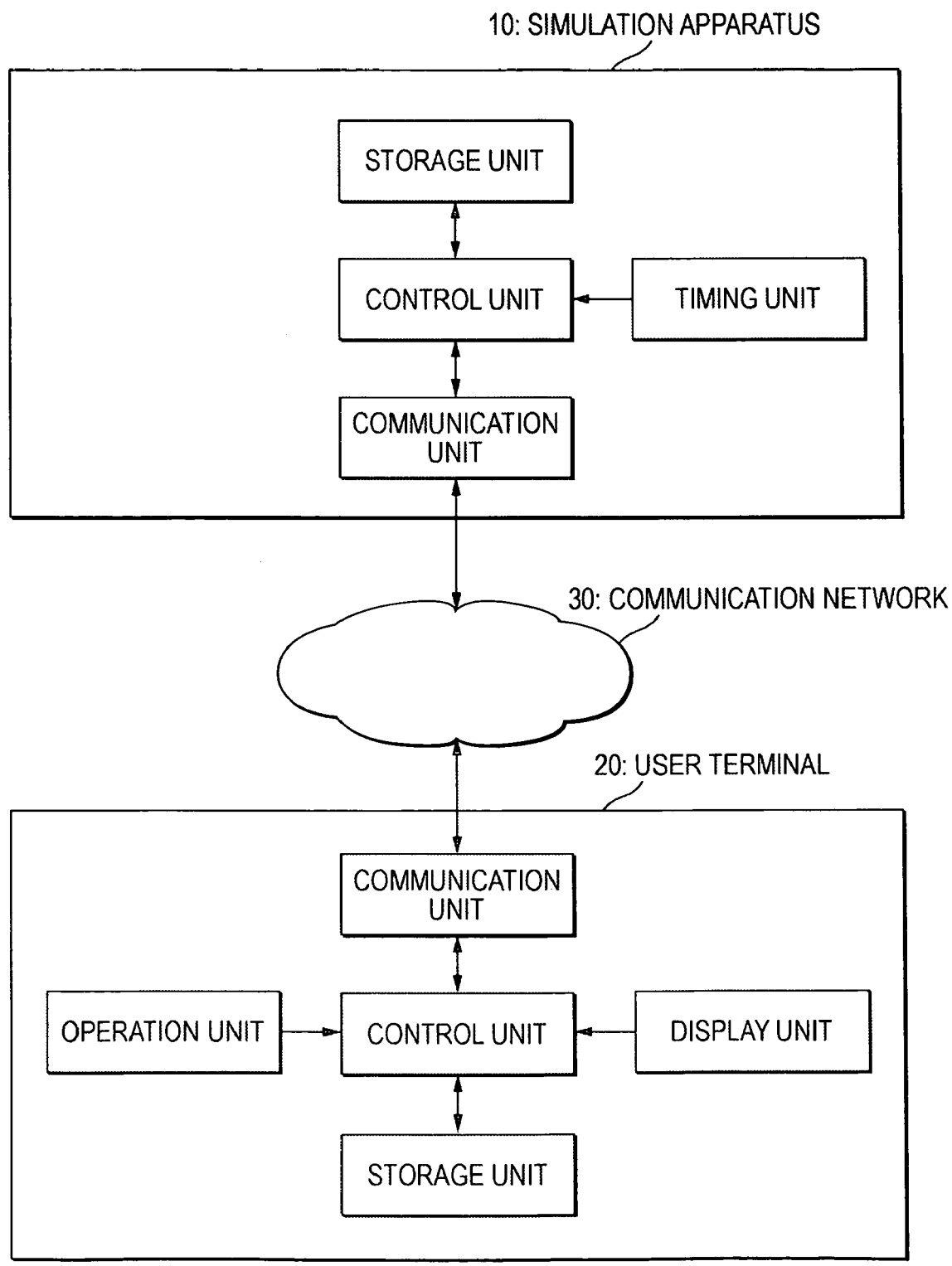
FIG. 1 is the whole diagram showing a schematic configuration of a computer system including an image forming device simulation apparatus according to an embodiment.

A simulation apparatus 10 according to the embodiment is connected to a user terminal 20 through a communication network 30 so that data communication can be conducted mutually as shown in FIG. 1. The communication network 30 may be a wide area network such as the Internet or may be a LAN (Local Area Network) such as an in-house intranet.

Here, the simulation apparatus 10 is, for example, a general server computer and is configured to include a control unit 11, a storage unit 12, a communication unit 13 and a timing unit 14. This simulation apparatus 10 corresponds to an image forming device simulation apparatus in the invention. The simulation apparatus 10 performs a simulation of processing performed by an image forming device in response to a processing request sent from the user terminal 20 and outputs a result to the user terminal 20.

As one example, the simulation apparatus 10 functions as a web application server for generating and sending data of a web page to a request from the user terminal 20. That is, the simulation apparatus 10 sends data of a web page generated by arranging information etc. which wants to be presented to a user as a result of a simulation or a user interface for prompting a user to input various information to the user terminal 20 and thereby, performs the simulation to output its result.

The control unit 11 of the simulation apparatus 10 is, for example, a CPU and operates according to a program stored in the storage unit 12. In the embodiment, a simulation of processing performed by the image forming device is performed based on a request from the user terminal 20. An example of processing performed by the control unit 11 in the embodiment will be described below in detail.

The storage unit 12 includes a storage medium capable of being read by a computer for holding programs executed by the control unit 11, and is configured to include at least one of a disk device and a memory element such as RAM or ROM. Also, the storage unit 12 operates as work memory of the control unit 11.

The communication unit 13 includes, for example, a network card and sends information through the communication network 30 according to instructions from the control unit 11. Also, the communication unit 13 receives information incoming through the communication network 30 and outputs the information to the control unit 11.

The timing unit 14 includes, for example, an IC chip for implementing a clock function, and outputs information about the present time to the control unit 11 according to instructions inputted from the control unit 11.

Also, the user terminal 20 is, for example, a personal computer and is configured to include a control unit 21, a storage unit 22, a communication unit 23, an operation unit 24 and a display unit 25. A user can make the simulation apparatus 10 perform a simulation of an image forming device by an instruction operation to the user terminal 20 and can check a result of the simulation by the simulation apparatus 10 by browsing information displayed on the display unit 25 of the user terminal 20.

As one example, when the simulation apparatus 10 functions as a web application server, the user terminal 20 executes a web browser program and displays data of a web page outputted by the simulation apparatus 10 on the display unit 25. As a result of this, a user can input various information necessary to perform a simulation on the web page or can check a result of the simulation displayed on the web page.

The control unit 21 of the user terminal 20 includes, for example, a CPU and operates according to a program stored in the storage unit 22. In the embodiment, a performing request of a simulation to the simulation apparatus 10 is outputted according to an instruction operation to the operation unit 24 of a user. Also, a result of the simulation performed sent from the simulation apparatus 10 is accepted and is displayed on the display unit 25.

The storage unit 22 includes a storage medium capable of being read by a computer for holding programs executed by the control unit 21, and is configured to include at least one of a disk device and a memory element such as RAM or ROM. Also, the storage unit 22 operates as work memory of the control unit 21.

The communication unit 23 includes, for example, a network card and sends information through the communication network 30 according to instructions from the control unit 21. Also, the communication unit 23 receives information incoming through the communication network 30 and outputs the information to the control unit 21.

The operation unit 24 includes, for example, a keyboard or a mouse, and accepts an instruction operation of a user, and outputs the contents of the instruction operation to the control unit 21. The display unit 25 includes, for example, a display device, and displays information according to instructions from the control unit 21.

Figure 2:
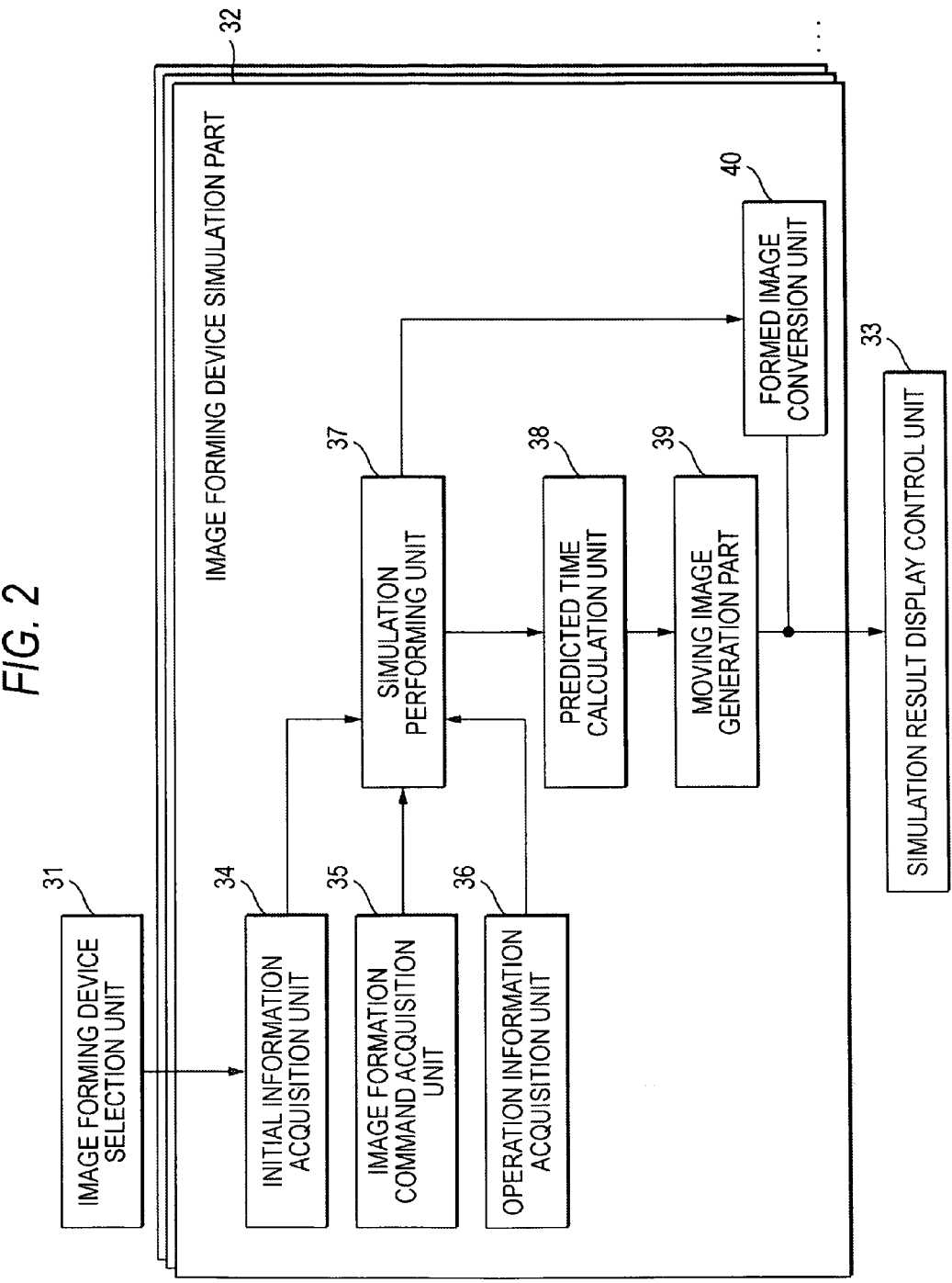
FIG. 2 is a functional block diagram showing a function of the image forming device simulation apparatus according to the embodiment.

Next, a function implemented by the simulation apparatus 10 in the embodiment will be described. The simulation apparatus 10 is configured to functionally include an image forming device selection unit 31, an image forming device simulation part 32 and a simulation result display control unit 33 as shown in FIG. 2. For example, the control unit 11 executes a program stored in the storage unit 12 and thereby, these functions can be implemented. In addition, when there are plural kinds of image forming devices capable of performing a simulation by the simulation apparatus 10, there may be plural image forming device simulation parts 32 with the image forming device simulation parts associated with each of the plural kinds of image forming devices.

The image forming device selection unit 31 selects an image forming device targeted for simulation from among plural kinds of image forming devices capable of performing a simulation by the simulation apparatus 10 based on an instruction operation to the operation unit 24 of the user terminal 20 by a user. In addition, when the simulation apparatus 10 copes with only one kind of image forming device, it is unnecessary to dispose the image forming device selection unit 31.

As one example, the image forming device selection unit 31 outputs web page data representing a printer selection screen and displays the screen on the display unit 25 of the user terminal 20. When a user selects an image forming device which wants to performs a simulation by an instruction operation to the operation unit 24 on the screen and depresses a decision button, the user terminal 20 sends information about the selected image forming device to the simulation apparatus 10 through the communication network 30. The image forming device selection unit 31 accepts the information about the selected image forming device and decides the image forming device targeted for simulation.

Also, the image forming device selection unit 31 may select plural image forming devices from among plural kinds of image forming devices capable of selection as a target of simulation according to an instruction operation of a user. In this case, the simulation apparatus 10 performs a simulation with respect to each of the plural image forming devices selected and, for example, may output results of respective simulations in a form in which a user can compare the results. A display example of the results of performing simulations with respect to plural image forming devices will be described below.

The image forming device simulation part 32 performs a simulation of processing performed by at least one image forming device targeted for simulation. In addition, when there are plural image forming device simulation parts 32, as described above, each of the image forming device simulation parts 32 is associated with a particular kind of image forming device and performs a simulation of processing performed by the associated image forming device.

Details of a function implemented by the image forming device simulation part 32 will be described herein. In the following description, an image forming device targeted for simulation by the image forming device simulation part 32 is set as an image forming device P. The image forming device simulation part 32 is configured to include an initial information acquisition unit 34, an image formation command acquisition unit 35, an operation information acquisition unit 36, a simulation performing unit 37, a predicted time calculation unit 38, a moving image generation part 39 and a formed image conversion unit 40.

The initial information acquisition unit 34 acquires initial information about an image forming device of a precondition in the case of performing a simulation. Concretely, the initial information is, for example, information (hardware information) about a hardware configuration such as information about an expansion tray or information about a memory capacity of expansion memory mounted in the image forming device P.

Also, the initial information acquisition unit 34 may acquire, for example, information (software information) about software processing performed by the image forming device P of an initialization value etc. to be set and registered to the image forming device P or information about a version of firmware installed in the image forming device P.

Or, the initial information acquisition unit 34 may acquire action mode information representing an action mode such as a standard setting mode according to selection of a user and acquire the contents of hardware information or software information based on the action mode information. That is, for example, when the standard setting mode is selected by an instruction operation of a user, the initial information acquisition unit 34 acquires information stored in the storage unit 12 with respect to a configuration predefined as a standard state of the image forming device P as hardware information or software information.

Figure 3:
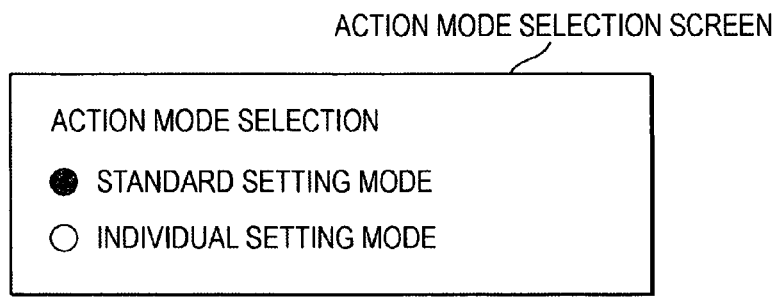
FIG. 3 is a diagram showing one example of an action mode selection screen displayed on a user terminal.

As one example, the initial information acquisition unit 34 outputs web page data representing an action mode selection screen as illustrated in FIG. 3 and displays the screen on the display unit 25 of the user terminal 20. A user selects action mode information representing an action mode of the image forming device P by an instruction operation to the operation unit 24 and depresses a decision button on the screen. In response to this, the user terminal 20 sends the selected action mode information to the simulation apparatus 10 through the communication network 30. The initial information acquisition unit 34 accepts the selected action mode information and decides software information or hardware information about the image forming device P targeted for simulation.

Figure 4:
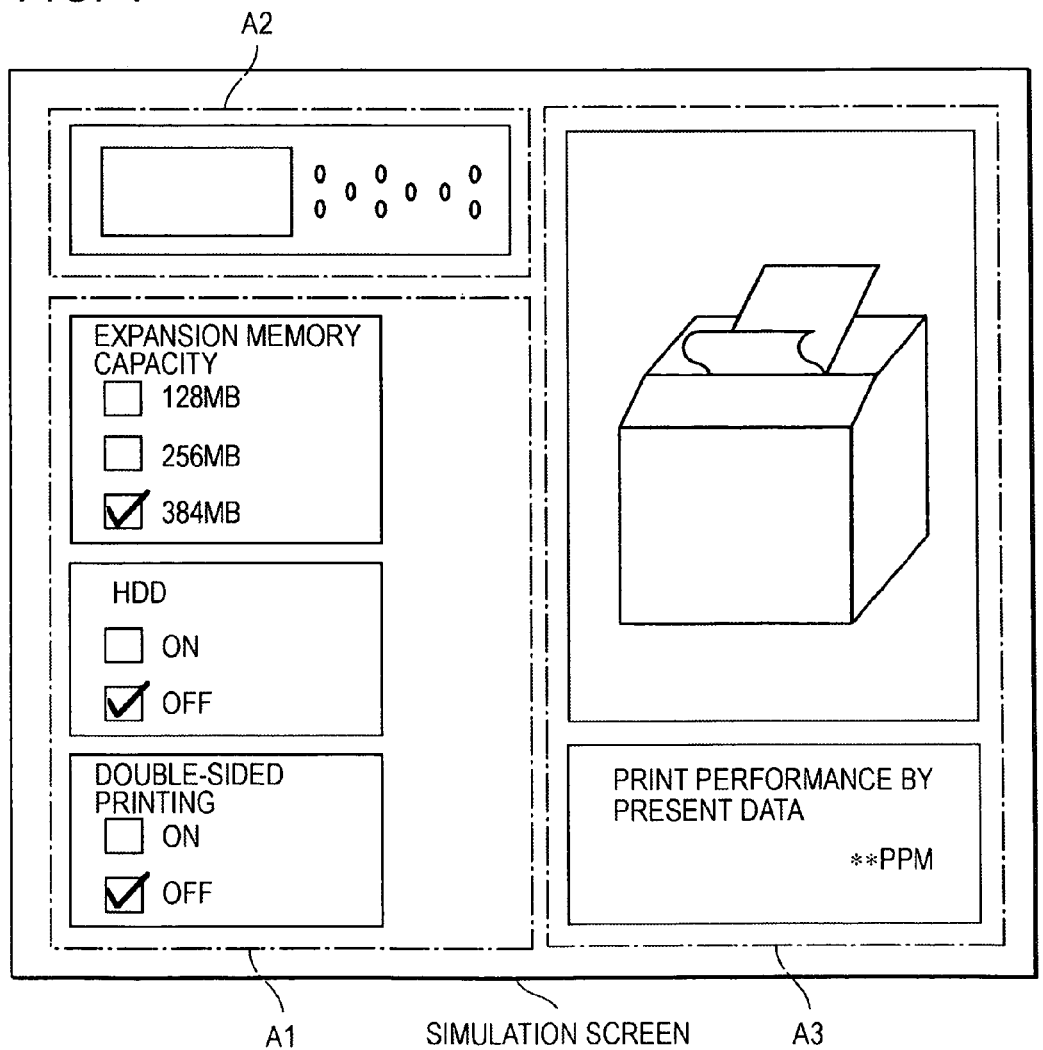
FIG. 4 is a diagram showing one example of a simulation screen displayed on the user terminal.
Figure 5A:
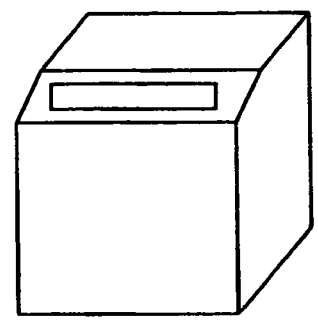
FIGS. 5A-5D are explanatory diagrams showing one example of a simulation moving image generated by the image forming device simulation apparatus according to the embodiment.
Figure 5B:
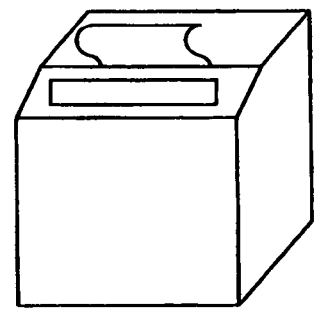
Figure 5C:
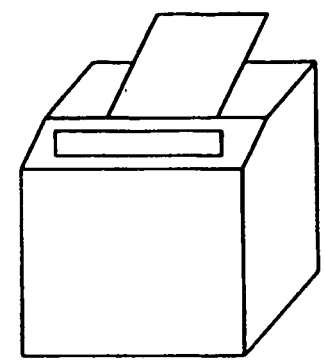
Figure 5D:
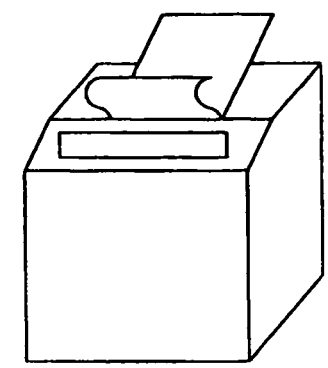

Also, when an individual setting mode is selected in the action mode selection screen as the action mode information, the initial information acquisition unit 34 may display an initial information input screen for prompting an input of hardware information or software information again on the display unit 25 of the user terminal 20, and individually acquire the information according to an instruction operation of a user. FIG. 4 is a diagram showing one example of a simulation screen displayed on the display unit 25 of the user terminal 20 at the time of performing a simulation. In the example of FIG. 4, an area A1 of the left side of the screen corresponds to the initial information input screen. A user performs an instruction operation to an user interface of check boxes etc. displayed in the area A1 and thereby, the user terminal 20 sends specified initial information to the simulation apparatus 10 and the initial information acquisition unit 34 can accept data sent and acquire the initial information.

The image formation command acquisition unit 35 acquires an image formation command R including information about a target image targeted for image formation by the image forming device P. The image formation command R is a control command which makes the image forming device P perform image formation and is described by, for example, a PDL (Page Description Language).

As a concrete example, the image formation command acquisition unit 35 acquires the image formation command R by, for example, a method as illustrated below.

An example in which the user terminal 20 sends an image formation command R generated on the user terminal 20 to the simulation apparatus 10 by an instruction operation to the operation unit 24 of a user and thereby the image formation command acquisition unit 35 acquires the image formation command R will be first described as a first example. In this case, for example, a user obtains a printer driver program for generating the image formation command R by, for example, downloading the printer driver program from a web server etc. (may be the simulation apparatus 10) and installs the printer driver program in the user terminal 20. Next, the user makes the user terminal 20 execute an application program and performs an instruction operation for doing printing together with specification for using the printer driver program. As a result of this, the control unit 21 of the user terminal 20 executes the printer driver program and generates the image formation command R. Further, the user specifies the generated image formation command R and performs an instruction operation for uploading the image formation command R on a web page displayed on the display unit 25. As a result of this, the user terminal 20 sends the image formation command R to the simulation apparatus 10 and the image formation command acquisition unit 35 accepts the sent image formation command R and thereby acquires the image formation command R.

According to this first example, a user generates an image formation command R necessary for simulation and then it is necessary to further perform an instruction operation for uploading the image formation command R, and time and effort are taken. Therefore, the user terminal 20 may send the image formation command R generated on the user terminal 20 to the simulation apparatus 10 as it is. This case will be described below as a second example.

In the second example, in a manner similar to the first example, a user installs a printer driver program in the user terminal 20 and gives print instructions from an application program. The control unit 21 of the user terminal 20 generates an image formation command R by executing the printer driver program and outputs the image formation command R to a virtual printer port. The image formation command R outputted to the virtual printer port is sent to the simulation apparatus 10 through the communication network 30. As a result of this, the image formation command acquisition unit 35 acquires the sent image formation command R.

In both the first and second examples, a user obtains a printer driver program and installs the printer driver program in the user terminal 20. As a result of this, the user can make the simulation apparatus 10 performs a simulation by performing an instruction operation similar to the case of making an image forming device P form an image with respect to the user terminal 20 actually. However, in these examples, it is necessary to newly install a printer driver program in the user terminal 20 for simulation, and time and effort are taken. Therefore, for example, the user terminal 20 may send application data by executing and generating an application program based on an instruction operation of a user to the simulation apparatus 10 as it is and the simulation apparatus 10 may generate an image formation command R. This case will be described below as a third example.

In the third example, a user performs an instruction operation for uploading application data representing an image which wants to be targeted for image formation by an image forming device P on, for example, a web page displayed on the display unit 25. As a result of this, the user terminal 20 sends the application data to the simulation apparatus 10. The control unit 11 of the simulation apparatus 10 accepting the application data performs predetermined processing according to a kind of the application data and generates an image formation command R corresponding to the image forming device P. As a result of this, the image formation command acquisition unit 35 can acquire the image formation command R without taking time and effort of a user. However, in this third example, the simulation apparatus 10 needs to comprise image formation command generation unit for performing predetermined processing according to a kind of application data in which a user wants to performs a simulation and generating an image formation command R based on the application data.

By the method of the examples described above, the image formation command acquisition unit 35 acquires an image formation command R generated based on application data held in the user terminal 20. The simulation performing unit 37 performs a simulation based on this image formation command R and thereby, a user can make the simulation apparatus 10 performs a simulation using application data in which the user actually wants to make an image forming device P form an image.

Also, the image formation command acquisition unit 35 may hold the acquired image formation command R in the storage unit 12. In this case, the image formation command acquisition unit 35 can acquire the image formation command R which is held in the storage unit 12 and is used as a target of processing at the time of performing the previous simulation according to instructions of a user when a simulation is performed the next time or later. As a result of this, time and effort of a user can be saved when conditions of an operating environment etc. are changed and simulations are performed several times. Or, the image formation command acquisition unit 35 may acquire predetermined sample data previously held in the storage unit 12 as an image formation command R according to instructions of a user.

Also, in the case of performing simulations with respect to plural image forming devices, when a data format of an image formation command R is the same in the plural image forming devices, the image formation command R acquired by the image formation command acquisition unit 35 included in the image forming device simulation part 32 associated with the particular image forming device may be acquired by the image formation command acquisition unit 35 included in another image forming device simulation part 32 and be used in simulation. As a result of this, a user performs an instruction operation for sending one image formation command R to the simulation apparatus 10 and thereby, simulations of the case of sending the image formation command R common to plural image forming devices can be performed respectively.

The operation information acquisition unit 36 acquires device operation information representing the contents of an instruction operation capable of being performed with respect to the image forming device P based on specification of a user. Concretely, for example, the image forming device P shall comprise an operation panel and the operation information acquisition unit 36 shall acquire information representing the contents of an instruction operation of a user to the operation panel as the device operation information. In this case, the operation information acquisition unit 36 displays an operation panel screen representing the operation panel in a simulation manner on the display unit 25 of the user terminal 20. For example, in the example of FIG. 4, an area A2 of the upper left portion of the screen corresponds to the operation panel screen. Then, the operation information acquisition unit 36 acquires the device operation information by accepting information sent to the simulation apparatus 10 by the user terminal 20 based on an instruction operation to the operation unit 24 of a user. As a result of this, the user can perform an instruction operation performed to the operation panel of the image forming device P on the operation panel screen in a simulation manner and the simulation apparatus 10 can simulate an action of the image forming device P according to the instruction operation of the user to the operation panel.

Also, when the image forming device P includes operation device other than the operation panel, the operation information acquisition unit 36 may display an input screen for specifying an instruction operation capable of being performed with respect to such operation device on the display unit 25 of the user terminal 20 and may acquire the device operation information based on the instruction operation of a user to the input screen.

The simulation performing unit 37 performs a simulation of processing performed by the image forming device P based on initial information acquired by the initial information acquisition unit 34, an image formation command R acquired by the image formation command acquisition unit 35 and device operation information acquired by the operation information acquisition unit 36.

As a concrete example, the simulation performing unit 37 performs a simulation in the following manner. That is, an operating environment of the image forming device P is first decided based on information about the image forming device P previously held in the storage unit 12 of the simulation apparatus 10, initial information acquired by the initial information acquisition unit 34 and device operation information acquired by the operation information acquisition unit 36. For example, the simulation performing unit 37 acquires memory capacity information about a capacity of memory which the image forming device P assumably includes based on information about a memory capacity of expansion memory acquired by the initial information acquisition unit 34 and a memory capacity of memory which the image forming device P includes in a normal state. Then, under the decided operating environment, processing performed by the image forming device P in the case of receiving an image formation command R is performed based on the image formation command R in a simulation manner.

Particularly in the embodiment, the simulation performing unit 37 performs a simulation of image formation processing described below and also, its processing time is measured and is outputted to the predicted time calculation unit 38. Concretely, the simulation performing unit 37 acquires, for example, start time at which a simulation of image formation processing is started and end time at which the simulation is ended based on information about the present time timed by the timing unit 14, and measures a difference between the start time and the end time as the processing time.

Image formation processing performed by the image forming device P targeted for simulation by the simulation performing unit 37 will be described herein. The image formation processing is processing in which the image forming device P forms a target image included in the image formation command R on a record medium. As a concrete example, the image forming device P makes a data analysis of each of one or plural target images included in the image formation command R based on the image formation command R and generates output image data according to each of the target images. For example, when the image forming device P includes image formation means for forming an image on the record medium using toner of four colors of cyan (C), magenta (M), yellow (Y), black (K), output image data is image data represented by four component colors of CMYK obtained by performing color conversion processing etc. in consideration of tone characteristics of the image formation means with respect to image data of the target image. Then, by sequentially outputting the output image data to the image formation means, the image formation means is made to execute image formation represented by the output image data. As a result of this, the image forming device P forms an image according to the target image on the record medium, and outputs the record medium on which the image is formed.

The simulation performing unit 37 generates the output image data outputted by the image forming device P based on the image formation command R by performing a simulation of this image formation processing. Also, processing time during that simulation is measured and is outputted to the predicted time calculation unit 38. In addition, the simulation performing unit 37 may measure processing time with respect to each of the processing for generating the output image data based on each of the plural target images.

Here, the simulation performing unit 37 may reserve a memory area of a capacity decided based on the memory capacity information described above in the storage unit 12 and performs a simulation of image formation processing using the reserved memory area. Thus, the image forming device P actually performs a simulation using the memory area according to a memory capacity available for the image formation processing and thereby, a simulation under the condition close to the actual image forming device P can be performed. As a result of this, processing time by the actual image forming device P can be predicted more accurately based on processing time taken to perform the simulation.

Also, the simulation performing unit 37 may generate formed image data representing a formed image formed on a record medium based on the generated output image data. For example, based on information about size of the record medium used or margin setting included in the image formation command R, formed image data representing a formed image in which an image represented by output image data is formed on a record medium is generated.

The predicted time calculation unit 38 calculates and outputs predicted time which it predictably takes the image forming device P to perform image formation processing based on processing time which it takes the simulation performing unit 37 to performs a simulation of the image formation processing. Concretely, for example, the predicted time calculation unit 38 calculates predicted time using a conversion table for associating the processing time with the predicted time. In this case, the conversion table for associating the processing time taken to perform the simulation with the predicted time taken to perform the image formation processing by the image forming device P shall be previously held in the storage unit 12 of the simulation apparatus 10. Here, an association relation between the processing time and the predicted time can be defined, for example, according to computation performance of the simulation apparatus 10 and information about performance of the image forming device P. Or, the predicted time calculation unit 38 may calculates the predicted time by substituting the processing time outputted by the simulation performing unit 37 for a predetermined function.

As a result of this, the predicted time calculation unit 38 can calculate the predicted time predictably taken to perform actual image formation processing by converting the processing time taken to performs a simulation in consideration of time etc. taken to perform an action for forming an image on a record medium actually by image formation means which the image forming device P includes or a difference between the image forming device P and the simulation apparatus 10 in computation performance.

Further, the predicted time calculation unit 38 may change a parameter included in a predetermined function or a value of predicted time in the conversion table described above based on, for example, initial information acquired by the initial information acquisition unit 34 or device operation information acquired by the operation information acquisition unit 36. For example, when information representing an instruction operation for specifying a monochrome image print mode or specifying a high-speed print mode with respect to an operation panel is acquired as the device operation information, the predicted time calculation unit 38 corrects the predicted time calculated according to the specification. As a result of this, time which it takes the image forming device P to perform image formation processing can be predicted according to a condition of an operating environment etc. specified by a user.

Also, the predicted time calculation unit 38 may respectively calculate predicted output wait time predictably taken to output start timing for starting an output of a record medium since the image forming device P acquired the image formation command R and predicted medium output time predictably taken to complete image formation processing and form all the target images on the record medium from the output start timing among the time taken to perform image formation processing. In this case, for example, the predicted time calculation unit 38 may respectively calculate the predicted output wait time and the predicted medium output time in a manner similar to the method for calculating the predicted time described above or, for example, may first calculate the predicted output wait time and the whole predicted time and then calculate the predicted medium output time by subtracting the predicted output wait time from the predicted time.

Further, the predicted time calculation unit 38 may calculate predicted single medium output time predictably taken to complete an output of the record medium since an output of the record medium on which the target image is formed was started with respect to each of the target images included in the image formation command R. The sum of the predicted single medium output times with respect to all the target images results in the predicted medium output time. The predicted single medium output time can be calculated based on, for example, an image formation speed of the image forming device P and processing time taken to performs a simulation of image formation processing with respect to each of the target images.

The moving image generation part 39 generates a simulation moving image representing a process of image formation in necessary time based on the predicted time calculated by the predicted time calculation unit 38 with respect to the image forming device P. For example, the moving image generation part 39 generates a moving image representing a situation in which the image forming device P forms all the target images included in the image formation command R on a record medium estimated from the calculated predicted time as the simulation moving image. As a concrete example, the moving image generation part 39 generates a moving image for sequentially displaying images as shown in FIGS. 5A, 5B, 5C and 5D as the simulation moving image. By presenting the simulation moving image generated thus to a user, the user can grasp time taken to form an image visually by a feeling close to the case of making the image forming device P form the image actually even in a state in which there is no image forming device P actually.

Also, the moving image generation part 39 may generate a simulation moving image of necessary time based on the predicted medium output time calculated by the predicted time calculation unit 38 based on selection etc. of a user. In this case, for example, the moving image generation part 39 generates a moving image representing a process to outputs of all the record media on which images are formed since an output of the record medium was started as soon as reproduction of a moving image is started. In this moving image, an image representing wait time taken to start the output of the record medium is not included and only a process in which the image forming device P outputs the medium can be checked. Further, in this case, necessary time of the portion representing a process of outputting each of the record media included in the simulation moving image may be decided based on the predicted single medium output time with respect to each of the target images calculated by the predicted time calculation unit 38.

The formed image conversion unit 40 converts formed image data generated by the simulation performing unit 37 into image data of a predetermined data format such as a bitmap format capable of being displayed on the display unit 25 of the user terminal 20, and outputs the formed image data to the simulation result display control unit 33. In addition, when display of a simulation result representing a formed image formed by the image forming device P is not required, it is unnecessary to dispose the formed image conversion unit 40.

The simulation result display control unit 33 performs display control processing for performing display on the display unit 25 of the user terminal 20 by outputting data outputted as a result of simulation by the image forming device simulation part 32 as, for example, web page data with respect to an image forming device selected by the image forming device selection unit 31. Data targeted for the display control processing includes, for example, a simulation moving image generated by the moving image generation part 39 or predicted time, predicted output wait time or predicted medium output time calculated by the predicted time calculation unit 38. Also, the simulation result display control unit 33 may display index information indicating performance of the image forming device P, for example, the number of output sheets of a record medium per minute of the image forming device P calculated based on the predicted time etc. Further, the formed image data etc. converted by the formed image conversion unit 40 may be included in the data targeted for the display control processing by the simulation result display control unit 33.

As a result of this, a user can check a result of the simulation performed on a screen of the user terminal 20. As one example, the simulation result display control unit 33 displays a simulation result display area A3 included in a simulation screen as illustrated in FIG. 4 on the display unit 25 of the user terminal 20.

Also, the simulation result display control unit 33 may display each of the simulation results on the display unit 25 of the user terminal 20 so that each of the simulation results can be compared when the image forming device selection unit 31 selects plural image forming devices and the image forming device simulation part 32 performs simulations with respect to each of the plural image forming devices.

Figure 6:
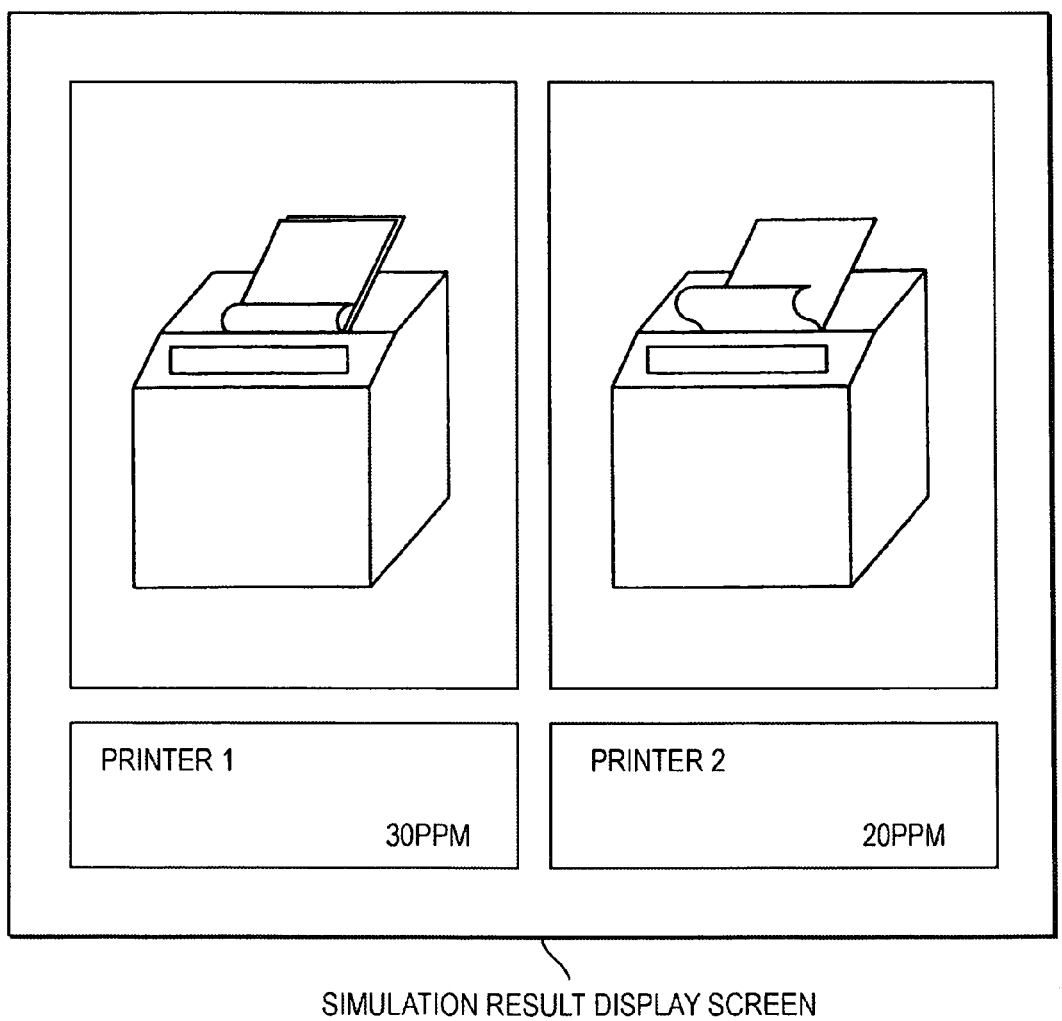
FIG. 6 is a diagram showing one example of a simulation result display screen displayed on the user terminal.

Particularly in this case, the simulation result display control unit 33 may perform display on the display unit 25 so as to simultaneously reproduce and start plural simulation moving images generated by the moving image generation part 39 with respect to each of the plural image forming devices. As a result of this, performance of plural image forming devices can be compared in a visually easy-to-understand form as if a user arranges plural image forming devices and simultaneously performs image formation processing by comparing plural simulation moving images. Also, when the moving image generation part 39 generates a simulation moving image of necessary time based on predicted medium output time, a process of image formation of the case where plural image forming devices simultaneously start outputs of media can be displayed. As a result of this, particularly, performance of the outputs of media can be directly compared in a visually easy-to-understand form. In such a case, the simulation result display control unit 33 displays a simulation result display screen as shown in FIG. 6 on the display unit 25 as one example.

Also, here, an ordering button associated with an image forming device may be included in a screen which the simulation result display control unit 33 displays on the display unit 25. The user terminal 20 sends ordering processing information about the image forming device associated with the button to a predetermined ordering processing server (may be the simulation apparatus 10) by an instruction operation of a user to the button. As a result of this, a user can check a simulation result and perform a buying procedure of the image forming device as it is. Particularly, by including ordering buttons associated with each of the image forming devices in the simulation result display screen capable of comparing simulation results of plural image forming devices, a user can compare results of performing simulations with respect to the plural image forming devices which are candidates for buying and can perform a buying procedure of the selected image forming device as it is.

Figure 7:
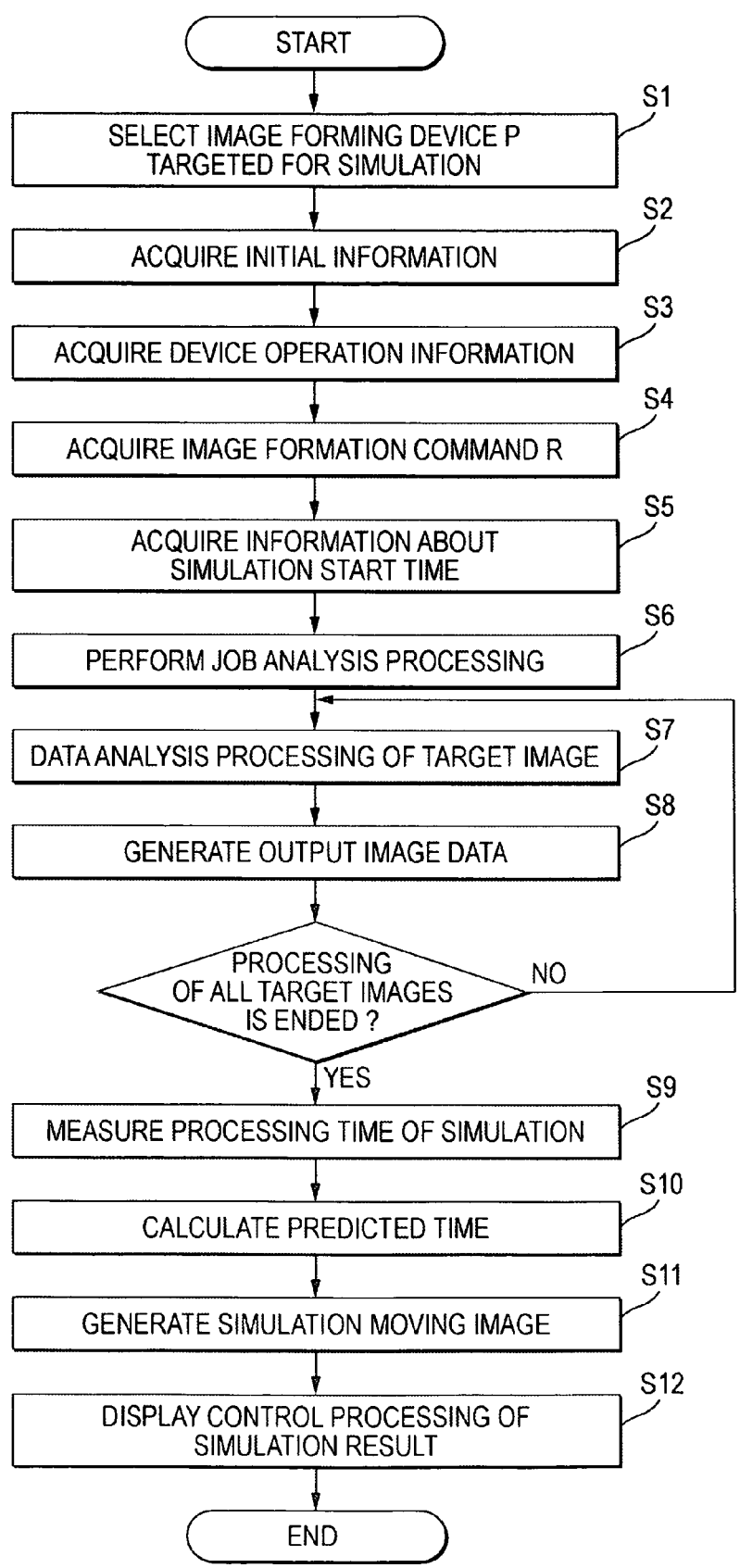
FIG. 7 is a flow diagram showing one example of processing performed by the image forming device simulation apparatus according to the embodiment.

Next, an example of a flow of the whole processing in which the simulation apparatus 10 performs a simulation in the embodiment will be described based on a flow diagram of FIG. 7.

First, the image forming device selection unit 31 selects an image forming device P targeted for simulation based on specification of a user (S1). Then, the initial information acquisition unit 34 of the image forming device simulation part 32 corresponding to an image forming device P acquires initial information about the image forming device P (S2). For example, the initial information acquisition unit 34 acquires expansion memory information about a capacity of memory expanded in the image forming device P.

Next, a user may perform an instruction operation to an operation panel screen according to an instruction operation in which various operating conditions are specified to the image forming device P. As a result of this, the operation information acquisition unit 36 acquires device operation information (S3).

Subsequently, the image formation command acquisition unit 35 acquires an image formation command R (S4). As a result of this, the simulation performing unit 37 starts a simulation of image formation processing performed by the image forming device P. In addition, the image formation command acquisition unit 35 may acquire plural image formation commands R. Also, the simulation performing unit 37 may start performing the simulation by an instruction operation for instructing a simulation start of a user after the image formation command acquisition unit 35 acquires the image formation command R.

The simulation performing unit 37 first acquires time at a point in time of starting the simulation from the timing unit 14 (S5). Next, job analysis processing is performed with respect to the portion described by a job control language included in the image formation command R (S6).

Subsequently, the simulation performing unit 37 performs the following processing with respect to each of the target images included in the image formation command R. That is, the simulation performing unit 37 first performs data analysis processing based on information about the target image targeted for processing included in the image formation command R (S7). Next, based on an analysis result by the processing of S7, image drawing processing is performed and output image data is generated (S8).

The simulation performing unit 37 repeatedly performs the processing of S7 and S8 with respect to all the target images targeted for image formation included in the image formation command R acquired. In addition, here, the simulation performing unit 37 may measure processing time with respect to each of the target images by acquiring time at a point in time before starting the processing of S7 and after ending the processing of S8 with respect to each of the target images targeted for processing from the timing unit 14. Further, when simulations of image formation processing are ended with respect to all the target images, time at a point in time of end is acquired from the timing unit 14 and processing time taken to performs a simulation of the whole image formation processing is measured (S9).

Then, the predicted time calculation unit 38 calculates predicted time taken to form an image based on the processing time obtained by the processing of S9 (S10). Subsequently, the moving image generation part 39 generates a simulation moving image based on the predicted time calculated by the processing of S10 (S11).

The simulation result display control unit 33 performs display control processing for displaying a result of simulation on the display unit 25 of the user terminal 20 (S12). As a concrete example, the simulation result display control unit 33 displays index information indicating performance calculated based on the predicted time obtained as a result of the processing of S10 and a simulation moving image obtained as a result of the processing of S11 on the display unit 25.

In addition, in the flow described above, the moving image generation part 39 generates the simulation moving image after the simulation of image formation processing by the simulation performing unit 37 is completed, but order of the processing is not limited to such order. For example, during a simulation by the simulation performing unit 37, the moving image generation part 39 may start generation of a simulation moving image and the simulation result display control unit 33 may sequentially display the generated simulation moving image on the display unit 25. In this case, the moving image generation part 39 ends generation of the simulation moving image so that the simulation moving image is ended in necessary time based on the calculated predicted time at a point in time when the simulation by the simulation performing unit 37 is completed and the predicted time calculation unit 38 calculates the whole predicted time. As a result of this, wait time to display of a simulation result for a user can be reduced.

According to the embodiment described above, by performing a simulation of image formation based on an image formation command including information about a target image, even in a state in which there is no image forming device, predicted time taken to perform image formation processing can be calculated and performance of an image forming device at the time of actual use of a user can be simulated. Also, even after an image forming device is bought, a user changes a capacity of expansion memory or a selection menu item etc. in printing from those of the image forming device in the present use and performs a simulation of image formation and thereby, can know a change in processing time of image formation processing caused by a change in setting information or expansion of hardware without trial using the image forming device actually.

Also, the invention is not limited to the embodiment described above, and can be implemented by various embodiments. For example, in the above description, a user has checked a result of simulation or has performed an instruction operation with respect to the user terminal 20 different from the simulation apparatus 10, but a function performed by the simulation apparatus 10 and a function performed by the user terminal 20 may be implemented on one computer. Or, the function performed by the simulation apparatus 10 may be implemented by cooperation of plural computers. For example, the image forming device simulation apparatus according to one embodiment may comprise a front end server for performing reception of information sent from the user terminal 20 and an output of a web page displayed on the user terminal 20, and a back end server for performing a simulation of processing performed by an image forming device.

What is claimed is:

1. An image forming device simulation apparatus for simulating processing performed by an image forming device, the image forming device simulation apparatus comprising:
   an image formation command acquisition unit that acquires an image formation command that instructs the image forming device to form a target image, the image formation command including data representing the target image;
   a simulation unit that simulates the image forming device processing the target image based on the image formation command, the simulated image forming device processing including simulating outputting the image to a recording medium; and
   a predicted time calculation unit that measures a time required to perform the simulated image forming device processing and calculates a time that approximates a time required by the image forming device to perform the processing based on the measured time required to perform the simulation.

2. The image forming device simulation apparatus according to claim 1, further comprising:
   a memory capacity information acquisition unit that acquires memory capacity information about an amount of memory included in the image forming device,
   wherein the simulation unit reserves an amount of memory to simulate the image forming device processing that is equal to the amount of memory included in the image forming device acquired by the memory capacity information acquisition unit and simulates the image forming device processing using only the reserved amount of memory.

3. The image forming device simulation apparatus according to claim 1, wherein the simulation unit simulates processing performed by each of a plurality of image forming devices,
   wherein the predicated time calculation unit measures a time required to perform the simulated image forming device processing for each of the plurality of image forming devices and calculates a time that approximates a time required by each of the plurality of image forming devices to perform the image forming device processing based on the measured time required to perform the simulation for each device, respectively, and
   wherein the image forming device simulation apparatus further comprises:
      a moving image generation unit that generates a plurality of moving images that respectively illustrate the plurality of image forming devices processing the image in real time based on the approximated time required for the plurality of image forming devices to process the image; and
      a moving image reproduction unit that controls a display device to simultaneously display the plurality of moving images.

4. The image forming device simulation apparatus according to claim 3, wherein the predicted time calculation unit respectively calculates an output wait time that approximates a time required by each of the plurality of image forming devices to start to output the image in response to receiving the image formation command and an output time that approximates a time required by each of the plurality of image forming devices to complete the image formation processing once the plurality of image forming devices begin to output the image after the output wait time, respectively, and wherein the moving image generation unit generates the plurality of moving images based on the approximated output wait times and output times.

5. The image forming device simulation apparatus according to claim 1, wherein the simulation unit virtually simulates the processing performed by the image forming device as if the image forming device was actually processing the image without the image forming device performing any processing.

6. The image forming device simulation apparatus according to claim 5, wherein the simulating outputting the image to the recording medium performed by the simulation unit comprises outputting the image to a display and not outputting the image to the recording medium.

7. The image forming device simulation apparatus according to claim 1, wherein the simulation unit simulates the processing performed by the image forming device without assistance from the image forming device.

8. An image forming device simulation method for simulating processing performed by an image forming device using a computer, the method comprising:
   acquiring an image formation command that instructs the image forming device to form a target image, the image formation command including data representing the target image;
   simulating the image forming device processing the target image based on the image formation command, the simulating the image forming device processing including simulating outputting the image to a recording medium;
   measuring a time required to perform the simulated image forming device processing;
   calculating a time that approximates a time required by the image forming device to perform the processing based on the measured time required to perform the simulating; and
   outputting the approximated time required by the image forming device to perform the processing.

9. The method according to claim 8, wherein the simulating comprises virtually simulating the processing performed by the image forming device as if the image forming device was actually processing the image without the image forming device performing any processing.

10. The method according to claim 9, wherein the simulating outputting the image to the recording medium comprises outputting the image to a display and not outputting the image to the recording medium.

11. The method according to claim 8, wherein the simulating comprises simulating the processing performed by the image forming device without assistance from the image forming device.

12. A computer-readable recording medium having embodied thereon a program, which when executed by a computer, causes the computer to perform an image forming device simulation method for simulating processing performed by an image forming device, the method comprising:
   acquiring an image formation command that instructs the image forming device to form a target image, the image formation command including data representing the target image;
   simulating the image forming device processing the target image based on the image formation command, the simulating the image forming device processing including simulating outputting the image to a second recording medium;
   measuring a time required to perform the simulated image forming device processing;
   calculating a time that approximates a time required by the image forming device to perform the processing based on the measured time required to perform the simulating; and
   outputting the approximated time required by the image forming device to perform the processing.

13. The computer-readable recording medium according to claim 12, wherein the simulating comprises virtually simulating the processing performed by the image forming device as if the image forming device was actually processing the image without the image forming device performing any processing.

14. The computer-readable recording medium according to claim 13, wherein the simulating outputting the image to the second recording medium comprises outputting the image to a display and not outputting the image to the second recording medium.

15. The computer-readable recording medium according to claim 12, wherein the simulating comprises simulating the processing performed by the image forming device without assistance from the image forming device.

* * * * *